United States Patent
Kasilya Sudarsan et al.

(10) Patent No.: US 9,716,795 B1
(45) Date of Patent: Jul. 25, 2017

(54) DIVERSION OF A CALL TO A WEARABLE DEVICE

(71) Applicant: QUALCOMM Incorporated, San Diego, CA (US)

(72) Inventors: Vishnu Vardhan Kasilya Sudarsan, Hyderabad (IN); Debesh Kumar Sahu, Hyderabad (IN); Jagadishwar Neela, Hyderabad (IN); Tushar Gupta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/984,361

(22) Filed: Dec. 30, 2015

(51) Int. Cl.
  *H04M 1/00* (2006.01)
  *H04M 3/54* (2006.01)
  *H04W 88/02* (2009.01)

(52) U.S. Cl.
  CPC ............. *H04M 3/54* (2013.01); *H04W 88/02* (2013.01)

(58) Field of Classification Search
  CPC .. H04M 3/543; H04M 3/42153; H04W 4/008
  USPC ... 455/417, 414.1, 415, 445, 41.1, 41.2, 418
  See application file for complete search history.

(56) References Cited

U.S. PATENT DOCUMENTS

| | | | |
|---|---|---|---|
| 8,515,407 B1 | 8/2013 | Mok et al. | |
| 9,024,749 B2* | 5/2015 | Ratajczyk | G08B 7/06 340/539.11 |
| 9,100,944 B2* | 8/2015 | Newham | H04W 4/008 |
| 9,504,077 B2* | 11/2016 | Newham | H04W 4/008 |
| 2005/0272408 A1 | 12/2005 | Wilkes-Gibbs et al. | |
| 2007/0105498 A1 | 5/2007 | Steudle et al. | |
| 2013/0036187 A1 | 2/2013 | Messer et al. | |
| 2014/0106677 A1* | 4/2014 | Altman | H04B 1/3827 455/41.2 |
| 2015/0004912 A1* | 1/2015 | Diamond | H04W 4/008 455/41.2 |
| 2015/0172441 A1 | 6/2015 | Samhat | |
| 2015/0189069 A1* | 7/2015 | Sayed | H04L 9/0872 455/418 |
| 2015/0271340 A1 | 9/2015 | Yu et al. | |
| 2015/0309536 A1* | 10/2015 | Dickinson | G06F 3/0412 345/173 |

(Continued)

FOREIGN PATENT DOCUMENTS

| | | |
|---|---|---|
| KR | 20140147789 A | 12/2014 |
| WO | 2014/143814 A1 | 9/2014 |
| WO | 2015057013 A1 | 4/2015 |

OTHER PUBLICATIONS

International Search Report and Written Opinion—PCT/US2016/061772—ISA/EPO—Feb. 24, 2017.

*Primary Examiner* — Cong Tran
(74) *Attorney, Agent, or Firm* — The Marbury Law Group

(57) ABSTRACT

Described herein are apparatuses, methods, and computer readable media for diverting a call from a server that receives calls to a wearable device (e.g., a watch) associated with a mobile device. In some embodiments, a mobile device determines whether a condition to activate a call diversion feature for the mobile device is met. In response to determining the condition is met, the mobile device communicates with the server to activate the call diversion feature for the mobile device. Subsequently, a call intended for the mobile device that is received at the server is diverted from the server to the wearable device.

25 Claims, 5 Drawing Sheets

(56) References Cited

U.S. PATENT DOCUMENTS

| | | | |
|---|---|---|---|
| 2015/0334657 A1* | 11/2015 | Newham | H04W 4/008 |
| | | | 455/41.2 |
| 2016/0057285 A1* | 2/2016 | Lee | H04M 3/42153 |
| | | | 455/417 |
| 2017/0041545 A1* | 2/2017 | Murgia | H04N 5/23267 |

* cited by examiner

| MOBILE DEVICE | CALL DIVERSION ENABLED | WEARABLE DEVICE |
|---|---|---|
| FIRST MOBILE DEVICE | YES | FIRST WEARABLE DEVICE |
| FIRST MOBILE DEVICE | YES | SECOND WEARABLE DEVICE |
| SECOND MOBILE DEVICE | YES | FIRST WEARABLE DEVICE |
| THIRD MOBILE DEVICE | NO | THIRD WEARABLE DEVICE |

FIG. 2

DIVERSION OF A CALL TO A WEARABLE DEVICE

TECHNICAL FIELD

The present application generally relates to transmission or diversion of calls.

BACKGROUND

Mobile devices may be difficult or cumbersome to carry or hold while running, exercising, swimming, or engaging in other activities. However, a person may miss calls received at the mobile device if not carrying his or her mobile device. Therefore, there is a need to enable a person to receive calls while not carrying his or her mobile device.

SUMMARY

This disclosure describes diverting a call intended for a mobile device to a wearable device (e.g., a smart watch) associated with the mobile device. In some embodiments, the mobile device may determine whether a condition to activate a call diversion feature for the mobile device is met. In response to determining the condition is met, the mobile device may communicate with a server to activate the call diversion feature for the mobile device. Subsequently, a call received at the server and intended for the mobile device may be diverted from the server to the wearable device. The condition may be met: (1) when the mobile device is stationary and when the wearable device is moving, and (2) when the wearable device is in contact with a user's body, and one of (3) when the mobile device is not communicatively coupled to the wearable device via a first communication interface (e.g., the mobile device is stationary and the wearable device moves out of range such that a connection cannot be established between the mobile device and the wearable device via the first communication interface), (4) based on a one-time or recurring schedule configured by a user of the mobile device or the wearable device, or using a schedule-generating application (e.g., in the mobile device) that implements the schedule based on a behavior pattern of the user, or (5) when a command is received at the mobile device from the wearable device to activate the call diversion feature. In some embodiments, a non-transitory computer readable medium is provided such that the non-transitory computer readable medium comprises computer executable code that, when executed by one or more processors of a computing device (e.g., a mobile device), causes the computing device to perform the various methods described herein.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

FIG. 2 is a diagram illustrating a call diversion table, in accordance with some embodiments of the disclosure;

Although similar reference numbers may be used to refer to similar elements for convenience, it can be appreciated that each of the various example implementations may be considered distinct variations.

DETAILED DESCRIPTION

Figure 1:
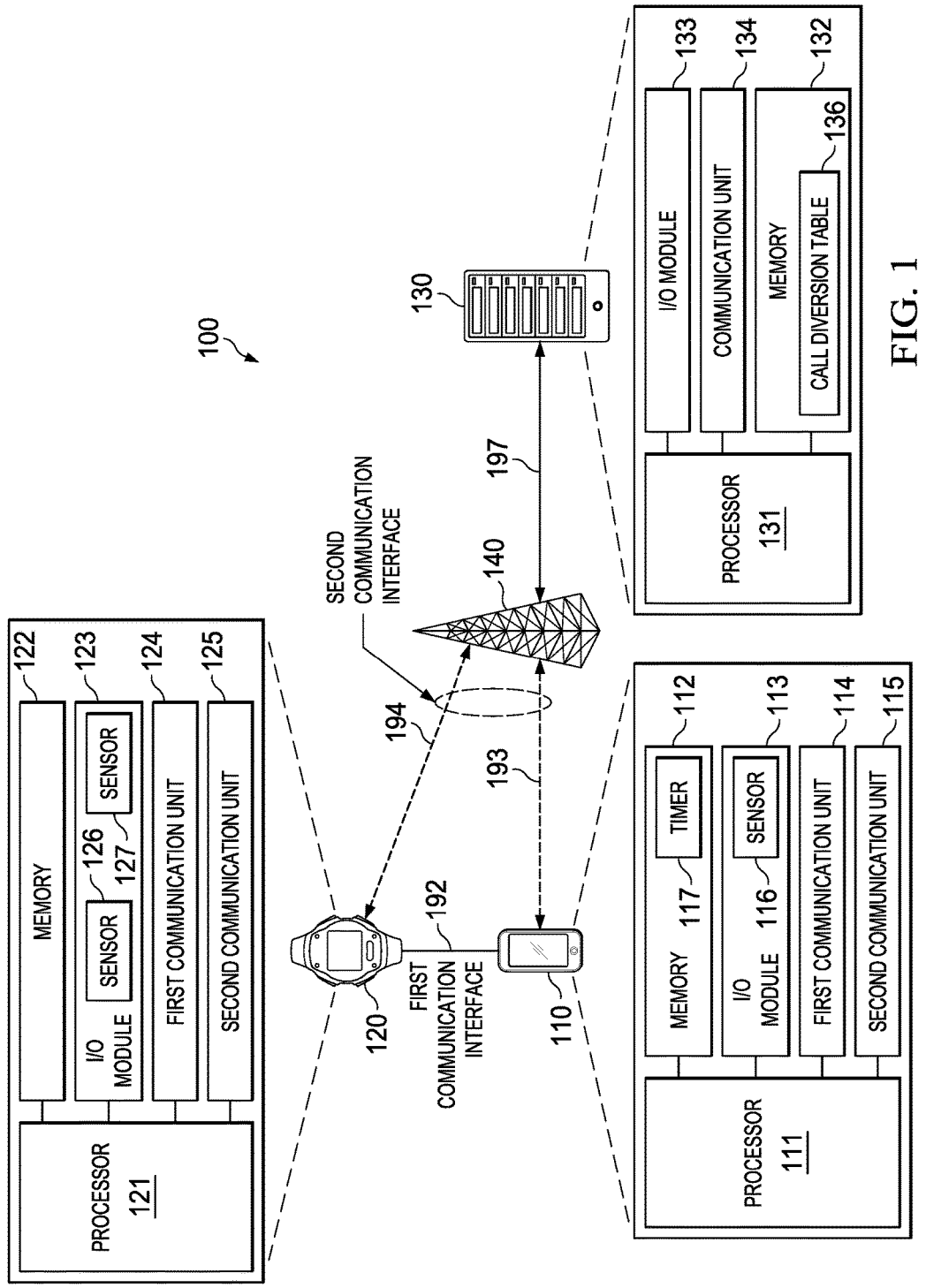
FIG. 1 is a block diagram illustrating a system environment for call diversion, where a mobile device is communicably coupled to a wearable device via a first communication interface, in accordance with some embodiments of the disclosure.

FIG. 1 is a block diagram illustrating a system environment 100 for call diversion, in accordance with some embodiments of the disclosure. The system environment 100 may comprise a mobile device 110, a wearable device 120, a server 130, and a cell tower 140. As used herein, call diversion refers to diverting, forwarding, or transmitting a call intended for the mobile device 110 from the server 130 directly to the wearable device 120, without passing through an intermediate device (e.g., the mobile device 110). The mobile device 110 and the wearable device 120 may be communicably coupled via a first communication interface 192. The first communication interface 192 may be a wired or wireless interface. In embodiments where the first communication interface 192 is a wireless interface, the first communication interface 192 may be a near field communication (NFC) interface, a Bluetooth interface, a Wi-Fi interface, a Wi-Fi peer-to-peer (P2P) interface, a Worldwide Interoperability for Microwave Access (WiMAX) interface, or any communication interface based on a communication protocol for establishing a connection between two devices separated by a range less than a threshold range. For example, the threshold range may be ten meters. If the range exceeds the threshold range, a connection between the devices may be established via an alternate communication interface such as a second communication interface 193, 194. The second communication interface 193, 194 may be any communication interface based on a communication protocol for establishing a connection between two devices separated by a range equal to or greater than the threshold range. The second communication interface 193, 194 may include a communication interface 193 from the mobile device 110 to the cell tower 140, and a communication interface 194 from the cell tower 140 to the wearable device 120. The second communication interface 193, 194 may be wireless interface. As an example, the second communication interface 193, 194 may be a cellular interface. In some embodiments, the second communication interface 193, 194 may be used for establishing a connection between mobile device 110 and wearable device 120 when the two devices cannot establish communication with each other although separated by a range less than the threshold range. For example, if a communication unit for establishing a connection via the first communication interface 192 is deactivated in either the mobile device 110 or the wearable device 120, then a connection between the two devices may be established via the second communication interface 193, 194.

The mobile device 110 and the wearable device 120 may exchange information via the first communication interface 192 or the second communication interface 193, 194. The information may comprise voice, video, and/or other information such as traffic associated with internet usage, messaging applications, other mobile application information, or other types of data communication information. The term "information" may also be referred to as "data." Although only two communication interfaces (first communication interface 192 and second communication interface 193, 194) are shown, additional communication interface(s) may exist to communicably couple and exchange information between the mobile device 110 and the wearable device 120.

A connection between the mobile device 110 and the cell tower 140 may be a connection established via the communication interface 193 of the second communication interface 193, 194. The server 130 may be associated with a cellular network. A connection 197 between the cell tower 140 and the server 130 may be a wired or wireless connection. In embodiments where the connection 197 between the cell tower 140 and the server 130 is a wireless connection, the connection may be established via a cellular interface or any other interface (e.g., a Wi-Fi interface). The mobile device 110 and the server 130 may exchange, via the communication interface 193 and the connection 197, voice, video and/or other information such as traffic associated with internet usage, messaging applications, other mobile application information, or other types of data communication information. A connection between the wearable device 120 and the cell tower 140 may be a connection established via the communication interface 194 of the second communication interface 193, 194. The wearable device 120 and the server 130 may exchange, via the communication interface 194 and the connection 197, voice, video and/or other information such as traffic associated with internet usage, messaging applications, other mobile application information, or other types of data communication information.

In the example system environment shown in FIG. 1, the mobile device 110 may comprise a processor 111, a memory 112, an input/output (I/O) module 113, a first communication unit 114, and a second communication unit 115. The wearable device 120 may comprise a processor 121, a memory 122, an I/O module 123, a first communication unit 124, and a second communication unit 125. The server 130 may comprise a processor 131, an I/O module 133, a communication unit 134, and a memory 132. Additional or alternative components other than those shown may be included in the mobile device 110, the wearable device 120, and the server 130. In some embodiments, the mobile device 110 may comprise a mobile phone or mobile computing device. The wearable device 120 may comprise a headless device (e.g., without a user interface), a watch or wristband, glasses or other eyewear, a portable media player, headgear, a gaming device, an earpiece, or another suitable device that is capable of receiving and/or placing calls.

In some embodiments, the first communication interface 192 may be a connection between the first communication unit 114 of the mobile device 110 and the first communication unit 124 of the wearable device 120. The second communication interface 193, 194 may be a connection, via a cell tower (e.g., the cell tower 140 or another cell tower not shown in FIG. 1), between the second communication unit 115 of the mobile device 110 and the second communication unit 125 of the wearable device 120. The second communication interface 193, 194 may include a communication interface 193 from the second communication unit 115 of the mobile device 110 to the cell tower 140, and a communication interface 194 from the cell tower 140 to the second communication unit 125 of the wearable device 120.

In some embodiments, any communication unit in the mobile device 110 (e.g., the first communication unit 114 or the second communication unit 115), the wearable device 120 (e.g., the first communication unit 124 or the second communication unit 125), or the server 130 (e.g., the communication unit 134) may include one or more transceivers, circuits, analog front end (AFE) units, antennas, processing units, memory, other logic, and/or other components to implement communication protocols and related functionality for communicating with other devices. In some embodiments, any communication unit in the mobile device 110, the wearable device 120, or the server 130 may include one or more modems, modem banks, Ethernet devices, serial interfaces, token ring devices, fiber distributed data interface (FDDI) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, NFC devices, Bluetooth devices, Wi-Fi or Wi-Fi P2P devices, WiMAX devices, and/or other devices for communication. Each of the various devices included in any of the communication units described in this disclosure may include device-specific components or components (e.g., antennas) that are shared with other devices. As an example, a Wi-Fi device may share an antenna with a WiMAX device.

In some embodiments, the processors 111, 121, and 131 may execute instructions, codes, computer programs, or scripts for the mobile device 110, the wearable device 120, and the server 130, respectively. The processors 111, 121, and 131 may be implemented as one or more processing circuits and may be hardware devices capable of executing computer instructions. The instructions, codes, computer programs, or scripts for the processors 111, 121, and 131, may be received from the memory 112, 122, and 132, respectively, from the I/O modules 113, 123, and 133, respectively, or from any communication unit in the mobile device 110, the wearable device 120, and the server 130, respectively.

In some embodiments, the memory 112, 122, and 132 may include random access memory (RAM), read only memory (ROM), cache memory, or various forms of secondary storage for the mobile device 110, the wearable device 120, and the server 130, respectively. RAM may be used to store volatile information and/or to store instructions that may be executed by the processors 111, 121, and 131. ROM may be a non-volatile memory device that may have a smaller memory capacity than the memory capacity of a secondary storage. ROM may be used to store instructions and/or information that may be read during execution of computer instructions. Secondary storage may be comprised of one or more disk drives or tape drives and may be used for non-volatile storage of information or as an overflow information storage device if RAM is not large enough to hold all working information. Secondary storage may be used to store programs that may be loaded into RAM when such programs are selected for execution. As an example, the memory 132 may include a call diversion table 136 that is explained in further detail in FIG. 2. In some embodiments, the call diversion table 136 may be located in an external memory outside the server 130 and accessible to the server 130. In some embodiments, the memory 112 may include a timer 117 that is activated for a particular period of time upon the mobile device 110 communicating with the server 130 to activate the call diversion feature for the mobile device 110.

The I/O modules 113, 123, and 133 may comprise input or output devices for supplying input to or receiving output from the mobile device 110, the wearable device 120, and the server 130, respectively. The I/O modules 113, 123, and 133 may include liquid crystal displays (LCDs), touch screen displays, keyboards, keypads, switches, dials, mice, track balls, voice or video recognizers, card readers, paper tape readers, printers, sensors, video monitors, or other input/output devices. For example, the I/O module 113 may include a sensor 116 for sensing whether the mobile device 110 is moving or stationary. The sensor 116 may represent a single or multiple sensors. In some embodiments, the sensor 116 may be an accelerometer or a pressure sensor that senses a level of movement associated with the mobile device 110. As a further example, the I/O module 123 may include a sensor 126 (e.g., an accelerometer or a pressure sensor) for sensing whether the wearable device 120 is moving or stationary, and a sensor 127 (e.g., a heartbeat sensor) for determining whether the wearable device 120 is in contact with a user's body. Each of the sensors 126 or 127 may represent single or multiple sensors.

As an example, a call may be received at the server 130. The server 130 may determine a target mobile device (e.g., the mobile device 110) associated with the call. For example, the server 130 may make this determination based on a phone number referenced in information associated with the call and received with the call. Other information associated with the call and received with the call may include a network address for the mobile device 110 or other identification information for the mobile device 110. The server 130 may use the received information to search the call diversion table 136 that may be located in the memory 132 or may be accessed from an external memory to determine whether an entry for the mobile device 110 is present in the call diversion table 136. If an entry for the mobile device 110 is not present in the call diversion table 136, or if an entry for the mobile device is present in the call diversion table 136 but the entry for the mobile device 110 indicates the call diversion feature for the mobile device 110 is deactivated, the server 130 may transmit the call to the mobile device 110 via the cell tower 140. If the mobile device 110 answers the call, a connection may be established between the second communication unit 115 of the mobile device 110 and the communication unit 134 of the server 130. Voice, video, and/or other information may be exchanged, via the cell tower 140, on this connection between the mobile device 110 and the server 130. If the mobile device 110 does not answer the call, a connection may not be established between the second communication unit 115 of the mobile device 110 and the communication unit 134 of the server 130.

If an entry for the mobile device 110 is present in the call diversion table 136, and if the entry indicates the call diversion feature for the mobile device 110 is activated, the server 130 may transmit the call to the wearable device 120 via the cell tower 140. If the wearable device 120 answers the call, a connection may be established between the second communication unit 125 of the wearable device 120 and the communication unit 134 of the server 130. Voice, video, and/or other information may be exchanged, via the cell tower 140, on this connection between the wearable device 120 and the server 130. If the wearable device 120 does not answer the call, a connection may not be established between the second communication unit 125 of the wearable device 120 and the communication unit 134 of the server 130.

FIG. 2 is a diagram illustrating a call diversion table 136, in accordance with some embodiments of the disclosure. The call diversion table 136 may be within the memory 132 of the server 130, or may be stored in an external memory that is accessible by the server 130. The call diversion table 136 may be organized to comprise a data table including a column 201 listing mobile devices, a column 202 listing whether call diversion is enabled for the mobile devices in column 201, and a column 203 listing wearable devices associated with mobile devices in column 201. In some embodiments, a mobile device (e.g., first mobile device, second mobile device, etc.) in an entry of column 201 may comprise mobile device information. Exemplary mobile device information may include a phone number, a network address, identification information for the mobile device, etc.

An entry in column 202 associated with each mobile device may either be a 'yes' or 'no' based on whether call diversion is enabled for a particular mobile device. A wearable device in an entry of column 203 may comprise wearable device information. Exemplary wearable device information may include a phone number, a network address, identification information for the wearable device, etc. In some embodiments, both a mobile device and an associated wearable device may have the same wearable device information (e.g., phone number). In other embodiments, a mobile device and an associated wearable device may have different wearable device information (e.g., phone numbers).

In some embodiments, a mobile device (e.g., the first mobile device) may be associated with more than one wearable device. Therefore, there may be two wearable devices (e.g., the first wearable device and the second wearable device) associated with the same mobile device (e.g., the first mobile device). In some embodiments, a wearable device (e.g., the first wearable device) may be associated with more than one mobile device (e.g., the first mobile device and the second mobile device).

Figure 3:
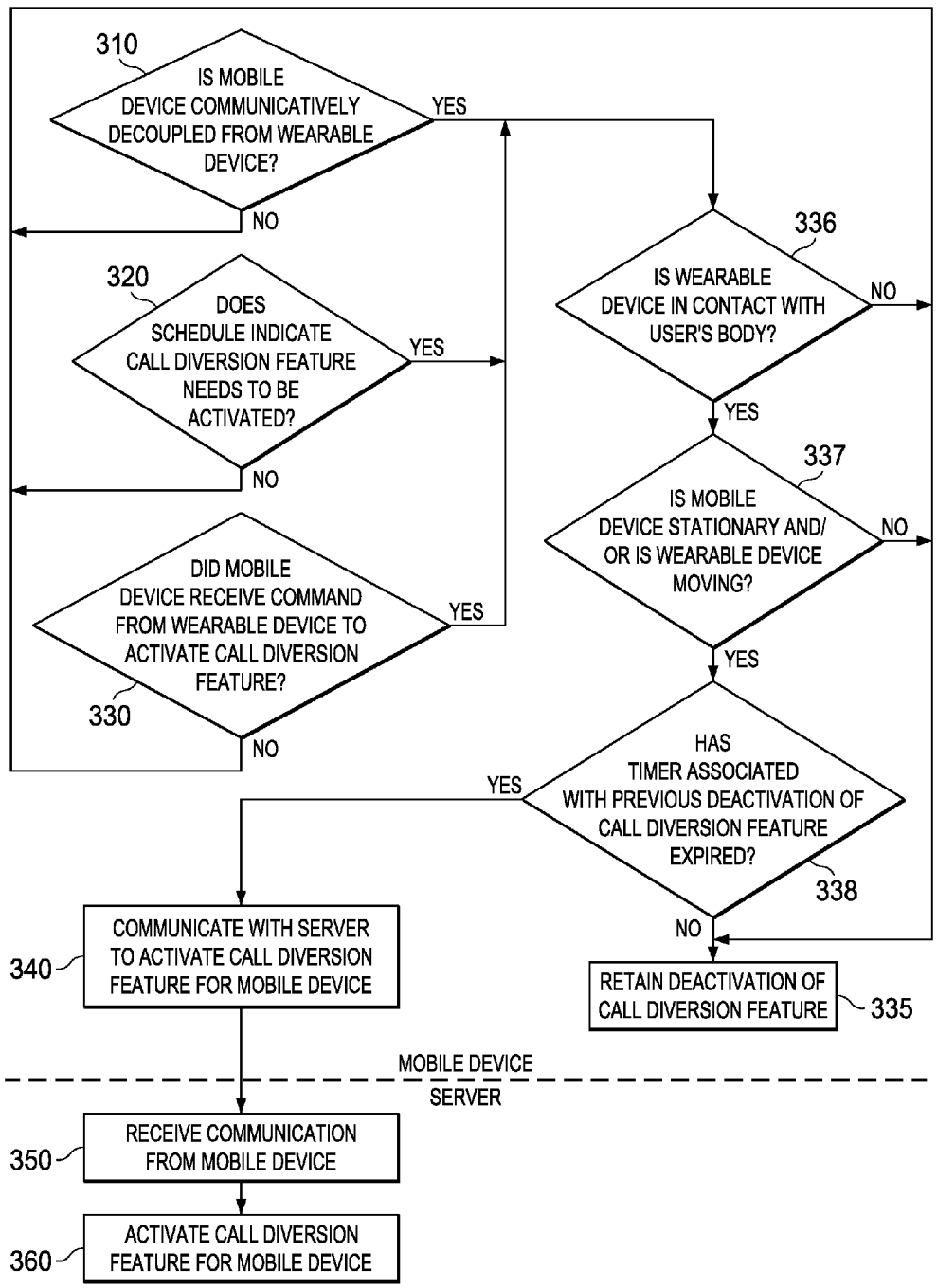
FIG. 3 is a diagram illustrating a method for activating a call diversion feature for a mobile device, in accordance with some embodiments of the disclosure.

FIG. 3 is a diagram illustrating a method for activating a call diversion feature for a mobile device (e.g., the mobile device 110), in accordance with some embodiments of the disclosure. At block 310, the method comprises determining whether a mobile device (e.g., the mobile device 110) is communicatively decoupled from a wearable device (e.g., the wearable device 120). The mobile device may be communicatively decoupled from the wearable device if there is no connection between the mobile device and the wearable device via a first communication interface (e.g., the first communication interface 192). There may be no connection between the mobile device and the wearable device if the distance between both devices is equal to or greater than the threshold range described with respect to FIG. 1. If the mobile device is communicatively decoupled from the wearable device, the method proceeds to block 336. If the mobile device is not communicatively decoupled from the wearable device, the method proceeds to block 335.

At block 320, the method further comprises determining whether a schedule associated with the mobile device indicates a call diversion feature is to be activated for the mobile device. The schedule may be stored in the mobile device or may be stored at a cloud server accessible by the mobile device. Additionally, the schedule may be input by a user into the mobile device, or may be transmitted to the mobile device from another computing device. For example, the user may input a schedule indicating that the user would like to activate the call diversion feature for the mobile device everyday from 5 PM to 6 PM. This may be a time frame during which the user leaves the mobile device at the user's house and goes for a jog in the neighborhood outside the user's house. Therefore, at 5 PM, a call diversion feature may need to be activated, and, at 6 PM, a previously activated call diversion feature may need to be deactivated.

In some embodiments, the schedule may be generated by a schedule-generating application that runs on the mobile device and learns or monitors the user's behavior pattern. For example, the schedule-generating application learns that the user does not answer calls received on the mobile device everyday from 5 PM to 6 PM. In such embodiments, the schedule-generating application may schedule the call diversion feature to be activated everyday from 5 PM to 6 PM. Therefore, at 5 PM, a call diversion feature may need to be activated, and, at 6 PM, a previously activated call diversion feature may need to be deactivated. Thus, the mobile device or a user associated with the mobile device may create a recurring schedule such that the call diversion feature may be activated and deactivated periodically based on the schedule. In some embodiments, a user may schedule a one-time activation of the call diversion feature for a particular period of time after which the call diversion feature may need to be deactivated. Therefore, if the schedule indicates that the call diversion feature needs to be activated, the method proceeds to block 336. If the schedule indicates the call diversion feature does not need to be activated, the method proceeds to block 335.

At block 330, the method further comprises determining whether the mobile device receives a command from the wearable device to activate the call diversion feature. For example, the user may have left the mobile device at the user's house, and after driving several miles away from the user's house, the user may want to activate the call diversion feature for the mobile device using the wearable device that is in the user's possession. When the user drives several miles away from the user's house, the distance between the mobile device and the wearable device may be equal to or greater than the threshold range described with respect to FIG. 1. In such an example, the user may communicate a command from the wearable device to the mobile device via the second communication interface 193, 194 (e.g., a cellular interface) described with respect to FIG. 1.

In another example, before leaving the user's house, the distance between the mobile device and the wearable device in the user's house may be less than the threshold range described with respect to FIG. 1. In such an example, the user may communicate a command from the wearable device to the mobile device via the first communication interface 192 or the second communication interface 193, 194 described with respect to FIG. 1. Once the mobile device receives the command at block 330, the method proceeds to block 336. If the mobile device does not receive a command at block 330, the method proceeds to block 335.

In some embodiments, at block 336, the method further comprises determining whether the wearable device (e.g., the wearable device 120) is in contact with a user's body. The mobile device (e.g., the mobile device 110) may make the determination of whether the wearable device is in contact with the user's body by receiving information from the wearable device. The wearable device may include one or more sensors (e.g., the sensor 127) that sense information associated with whether the wearable device is in contact with the user's body. For example, the one or more sensors may include a heartbeat sensor that measures the heart rate of the user. The wearable device may make a determination on whether the wearable device is in contact with the user's body based on the information sensed by the heartbeat sensor. This determination may be communicated to the mobile device. In other embodiments, the wearable device may transmit the information sensed by the heartbeat sensor to the mobile device, and the mobile device may determine, using the received information, whether the wearable device is in contact with the user's body. If the mobile device determines that the wearable device is in contact with the user's body, the method proceeds to block 337. If the mobile device determines that the wearable device is not in contact with the user's body, the method proceeds to block 335.

In some embodiments, at block 337, the method further comprises determining whether the mobile device (e.g., the mobile device 110) is stationary and/or whether the wearable device (e.g., the wearable device 120) is moving. The determination of whether the mobile device is stationary may be made using information sensed by one or more sensors (e.g., the sensor 116) located in the mobile device. For example, a sensor may be an accelerometer or a pressure sensor. The mobile device may determine that it is stationary if the sensed movement of the mobile device, based on the information sensed by the one or more sensors, is less than a threshold movement level.

The determination of whether the wearable device is moving may be made using information sensed by one or more sensors (e.g., the sensor 126) located in the wearable device. For example, a sensor may be an accelerometer or a pressure sensor. The wearable device may determine that it is moving if the sensed movement of the wearable device, based on the information sensed by the one or more sensors, is equal to or greater than a threshold movement level. This determination may be communicated to the mobile device. In other embodiments, the wearable device may transmit the information sensed by the one or more sensors to the mobile device, and the mobile device may determine, using the received information, whether the wearable device is moving. If the mobile device determines that the mobile device is stationary and/or the wearable device is moving, the method proceeds to block 338. If the mobile device determines that the mobile device is not stationary and/or the wearable device is not moving, the method proceeds to block 335 where the method further comprises retaining the deactivation of the call diversion feature for the mobile device.

In some embodiments, at block 338, the method further comprises determining whether a timer (e.g., the timer 117) associated with a previous deactivation of the call diversion feature has expired. When the wearable device (e.g., the wearable device 120) is constantly switching between a location near the edge of the threshold range between the wearable device and the mobile device described with respect to FIG. 1 outside the threshold range, and a location near the edge of the threshold range inside the threshold range, the mobile device (e.g., the mobile device 110) may constantly switch between establishing a connection to the wearable device via the first communication interface (e.g., the first communication interface 192), and losing the connection to the wearable device via the first communication interface. If the mobile device is constantly switching between establishing a connection to the wearable device via the first communication interface, and losing the connection to the wearable device via the first communication interface, this may result in a "ping-pong" situation where the mobile device is constantly switching between communicating with the server (e.g., the server 130) to activate the call diversion feature for the mobile device and communicating with the server to deactivate the call diversion feature for the mobile device. Such a "ping-pong" situation is undesirable because constant communication with the server to activate and deactivate the call diversion feature may cause expenditure of energy resources for the mobile device that may be better utilized for other mobile device functions such as executing one or more applications on the mobile device.

In order to prevent this "ping-pong" situation, the mobile device may include a hysteresis timer (e.g., the timer 117) that is activated by the mobile device upon communicating with the server to activate or deactivate the call diversion feature. Activating the timer may place the mobile device in a state of hysteresis such that the mobile device does not respond to conditions that would otherwise cause the mobile device to communicate with the server to activate or deactivate the call diversion feature. For example, assume that the timer is deactivated, that the call diversion feature for the mobile device is activated, and that the wearable device subsequently moves from a location outside the threshold range described with respect to FIG. 1 to a location inside the threshold range. This movement may cause the mobile device to communicate with the server to deactivate the call diversion feature for the mobile device. This communication may also cause activation of the timer. During the period when the timer is activated, the wearable device may move back to a location outside the threshold range described with respect to FIG. 1 such that the mobile device cannot establish a connection to the wearable device via the first communication interface (e.g., the first communication interface 192). This movement may not cause the mobile device to communicate with the server to activate the call diversion feature for the mobile device because the timer has not expired and is still activated. If this movement occurs after the expiration of the timer, the mobile device may communicate with the server to activate the call diversion feature for the mobile device. Therefore, if the timer in block 338 has expired, the method proceeds to block 340, and if the timer in block 338 has not expired, the method proceeds to block 335.

Blocks 310, 320, 330, 336, 337, and 338 may represent conditions that cause a call diversion feature to be activated at the mobile device. Each of the various conditions may be considered singly or in combination for causing a call diversion feature to be activated at the mobile device. The activation of the call diversion feature at the mobile device may be initiated based on a communication, at block 340, from the mobile device to the server. At block 350, the method further comprises receiving (e.g., by the server) the communication from the mobile device. The communication may comprise a request to activate the call diversion feature and, optionally, any information for activating the call diversion feature. For example, information for activating the call diversion feature may include information (e.g., a phone number, a network address, device identification information, etc.) associated with the mobile device. If the request is a first-time request for activating the call diversion feature for the mobile device, the communication from the mobile device may include the request for activating the call diversion feature, information associated with the mobile device, and information associated with the wearable device (e.g., a phone number, a network address, device identification information, etc.). If the request is not a first-time request, the communication from the mobile device may include the request for activating the call diversion feature and the information associated with the mobile device. However, even if the request is not a first-time request and if the mobile device or a user of the mobile wants to forward calls to a new or different wearable device, the communication from the mobile device may include the request for activating the call diversion feature, information associated with the mobile device, and information associated with the new or different wearable device.

The server may receive the communication at block 350, and may access a call diversion table (e.g., the call diversion table 136) to determine whether an entry already exists for the mobile device. This determination may be made by performing a search in the call diversion table for information associated with the mobile device received in the communication. If an entry does not exist for the mobile device, the server creates an entry for the mobile device in the call diversion table. At block 360, the method further comprises activating the call diversion feature for the mobile device (e.g., selecting a 'yes' for the mobile device as indicated in FIG. 2). The entry for the mobile device may comprise the information associated with the mobile device received in the communication from the mobile device. If an entry already exists for the mobile device, the server may merely activate the call diversion feature for the mobile device at block 360.

If information associated with a wearable device is also received in the communication, the server inputs the information associated with the wearable device in an entry of the column 203 associated with an entry for a mobile device as indicated in FIG. 2. If information associated with the wearable device is already present in the column 203 associated with an entry for a mobile device, in some embodiments, the server may overwrite the information that is already present in the entry of the column 203. In other embodiments, the server may append the received wearable device information (e.g., associated with a second wearable device) to the entry that already comprises information for a wearable device (e.g., a first wearable device) associated the mobile device. In such embodiments, any call may be forwarded to both the first wearable device and the second wearable device. Once the call diversion feature for the mobile device is activated, any calls received at the server and intended for the mobile device may be transmitted to one or more wearable devices associated with the mobile device, and not to the mobile device.

The various blocks of FIG. 3 may be executed in any order, and the order is not limited to the order described herein. For example, block 310 may be executed substantially simultaneously as block 320, and alternatively, block 320 may be executed before or after block 310. In some embodiments, some blocks may be optional. For example, block 320 may be optional.

Before execution of block 310, 320, 330, 336, 337, or 338, a call diversion feature may be deactivated for the mobile device. Blocks 310, 320, 330, 335, 336, 337, 338 and 340 may be performed by the mobile device 110. Therefore, these blocks may be stored as instructions in the memory 112, and may be executed by the processor 111 of the mobile device 110. Blocks 350 and 360 may be performed by the server 130. Therefore, these blocks may be stored as instructions in the memory 132, and may be executed by the processor 131 of the server 130.

Figure 4:
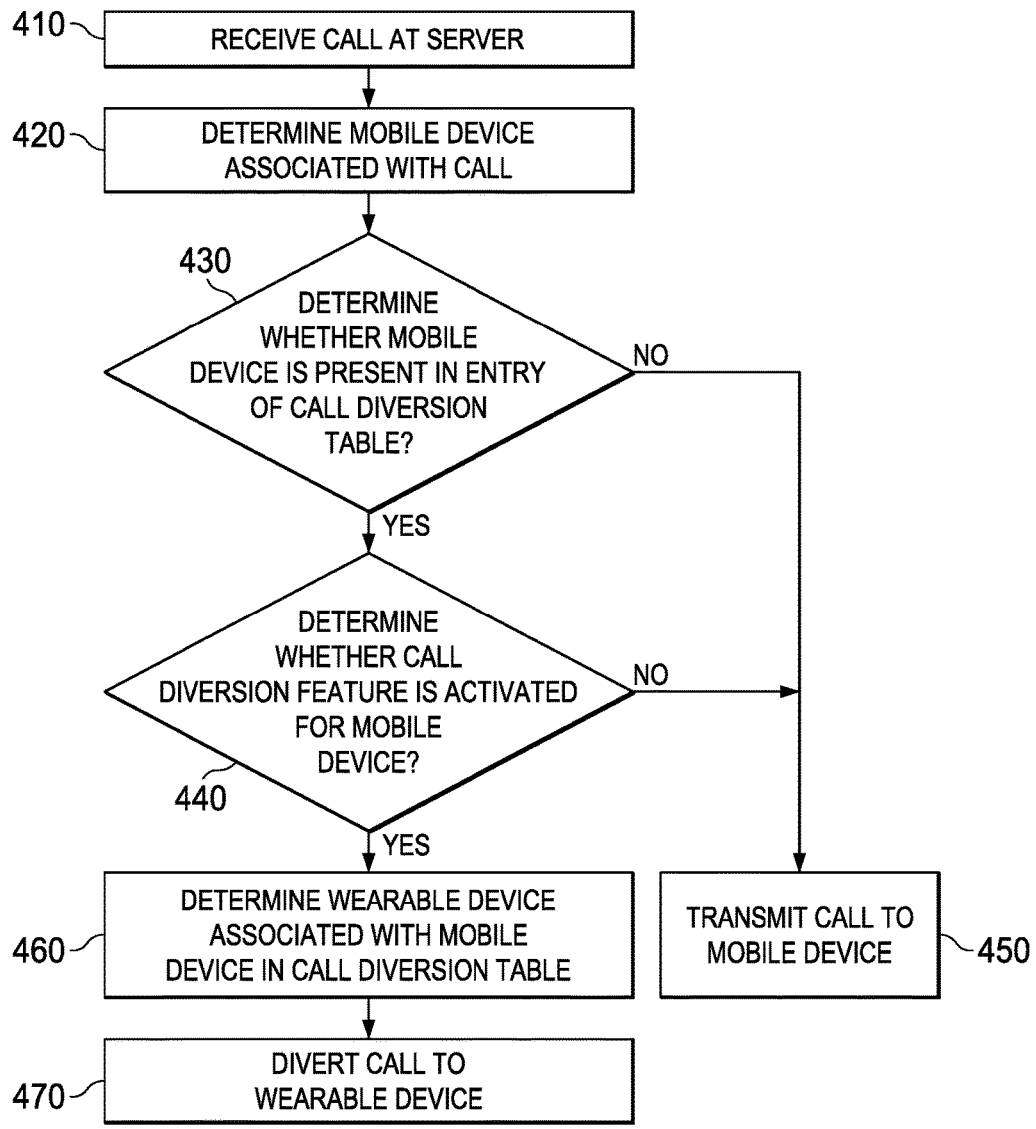
FIG. 4 is a diagram illustrating a method for processing a call, in accordance with some embodiments of the disclosure.

FIG. 4 is a diagram illustrating a method for processing a call, in accordance with some embodiments of the disclosure. At block 410, the method comprises receiving a call at the server. The call may be associated with information (e.g., voice information, video information, any associated information for a target mobile device etc.). At block 420, the method further comprises determining a mobile device (e.g., a target mobile device such as mobile device 110) associated with the call. The mobile device may be determined based on the received information associated with the call. For example, the information may comprise a phone number associated with the mobile device or other information associated with the mobile device (e.g., a network address, device identification information, etc.). Using the information associated with the mobile device, the server may search a call diversion table (e.g., the call diversion table 136) stored in the server or stored at an external memory. At block 430, the method further comprises determining whether the mobile device identified in block 420 is present in an entry of the call diversion table. If the mobile device identified in block 420 is present in an entry of the call diversion table, the method proceeds to block 440. If the mobile device identified in block 420 is not present in an entry of the call diversion table, the method proceeds to block 450, which is described below.

At block 440, the method further comprises determining whether a call diversion feature is activated for the mobile device. If the call diversion feature is not activated for the mobile device, the method proceeds to block 450. At block 450, the method further comprises transmitting the call to the mobile device. The call may be transmitted from the server to the mobile device via a cell tower (e.g., the cell tower 140). If the call diversion feature is activated for the mobile device, the method proceeds to block 460. At block 460, the method further comprises determining a wearable device associated with the mobile device in the call diversion table.

At block 470, the method further comprises diverting the call to the wearable device. The call may be diverted from the server to the wearable device via the cell tower. In some embodiments, there may be more than one wearable device associated with the mobile device in the call diversion table. In such embodiments, at block 460, the method further comprises diverting the call to each of the multiple wearable devices associated with the mobile device in the call diversion table. In some embodiments, a call as used in this disclosure may refer to a voice call. Additionally or alternatively, a call may also refer to video call. In embodiments where the call is a video call and is diverted from the server to the wearable device, the user of the wearable device may select a first option on the wearable device to accept the video call (video and voice), a second option on the wearable device to accept only a voice component (no video) of the video call, a third option on the wearable device to accept only a video component (no voice) of the video call, or a fourth option to reject the call. In alternate embodiments where the call is a video call and is diverted from the server to the wearable device, the wearable device may determine the bandwidth (rate of data transfer) of the connection between the server and the wearable device, and determine which option (e.g., video only, voice only, video and voice, reject call) to select based on the bandwidth of the connection. For example, if the bandwidth of the connection is greater than a first threshold level, the wearable device may select the video and voice option. As another example, if the bandwidth of the connection is less the first threshold level but equal to or greater than a lower second threshold level, the wearable device may select the voice only option or the video only option. As a further example, if the bandwidth of the connection is less than the second threshold level, the wearable device may reject the call.

The various blocks of FIG. 4 may be executed in any order, and the order is not limited to the order described herein. Blocks may be executed before, after, or substantially simultaneously with other blocks shown in FIG. 4. For example, block 410 may be executed substantially simultaneously as block 420. The method may be executed by a server (e.g., the server 130). As an example, the blocks of FIG. 4 may be stored as instructions in the memory 132, and may be executed by the processor 131 of the server 130.

Figure 5:
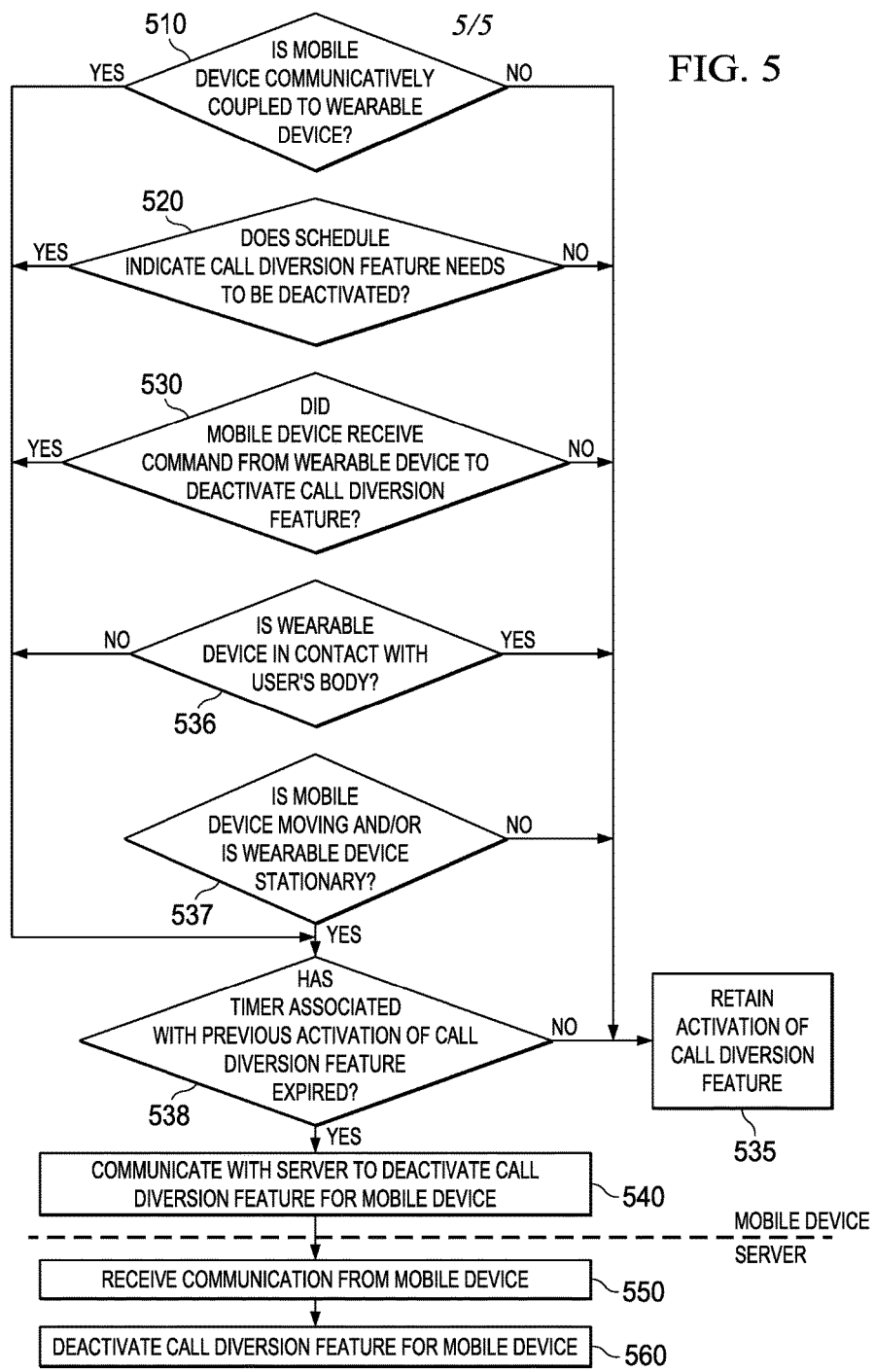
FIG. 5 is a diagram illustrating a method for deactivating a call diversion feature for a mobile device, in accordance with some embodiments of the disclosure.

FIG. 5 is a diagram illustrating a method for deactivating a call diversion feature for a mobile device (e.g., the mobile device 110), in accordance with some embodiments of the disclosure. At block 510, the method comprises determining whether a mobile device (e.g., the mobile device 110) is communicatively coupled to a wearable device (e.g., the wearable device 120). The mobile device may be communicatively coupled to the wearable device if there is a connection between the mobile device and the wearable device via a first communication interface (e.g., the first communication interface 192). There may be a connection between the mobile device and the wearable device if the wearable device is located within the threshold range of the mobile device as described with respect to FIG. 1. If the mobile device is communicatively coupled to the wearable device, the method proceeds to block 538. If the mobile device is not communicatively coupled to the wearable device, the method proceeds to block 535.

At block 520, the method further comprises determining whether a schedule associated with the mobile device indicates whether a call diversion feature needs to be deactivated for the mobile device. The schedule may stored in the mobile device or may be stored at a cloud server accessible by the mobile device. Additionally, the schedule may be input by a user into the mobile device, or may be transmitted to the mobile device from another computing device. For example, the user may input a schedule indicating that the user would like to activate the call diversion feature for the mobile device everyday from 5 PM to 6 PM. This may be a time frame during which the user leaves the mobile device at the user's house and goes for a jog in the neighborhood outside the user's house. Therefore, at 5 PM, a call diversion feature may need to be activated, and, at 6 PM, a previously activated call diversion feature may need to be deactivated.

In some embodiments, the schedule may be generated by a schedule-generating application that runs on the mobile device and learns or monitors the user's behavior pattern. For example, the schedule-generating application learns that a user does not answer calls received on the mobile device everyday from 5 PM to 6 PM. In such embodiments, the schedule-generating application may schedule the call diversion feature to be activated everyday from 5 PM to 6 PM. Therefore, at 5 PM, a call diversion feature may need to be activated, and, at 6 PM, a previously activated call diversion feature may need to be deactivated. Thus, the mobile device or a user associated with the mobile device may create a schedule for activating and deactivating the call diversion feature. In some embodiments, a user may schedule a one-time activation of the call diversion feature for a particular period of time after which the call diversion feature may need to be deactivated. If the schedule indicates that the call diversion feature needs to be deactivated, the method proceeds to block 538. If the schedule indicates the call diversion feature does not need to be deactivated, the method proceeds to block 535.

At block 530, the method further comprises determining whether the mobile device receives a command from the wearable device to deactivate the call diversion feature. For example, the user may have left the mobile device at the user's house, and after driving several miles away from the user's house, the user may want to deactivate the call diversion feature for the mobile device using the wearable device that is in the user's possession. The user may want to deactivate the call diversion feature if the user does not want to be disturbed by any incoming calls on the wearable device. When the user drives several miles away from the user's house, the wearable device is not located within the threshold range of the mobile device as described with respect to FIG. 1. In such an example, the user may communicate a command from the wearable device to the mobile device via the second communication interface 193, 194 (e.g., a cellular interface) described with respect to FIG. 1.

In another example, prior to leaving the user's house, the wearable device that is in the user's possession is located within the threshold range of the mobile device as described with respect to FIG. 1. In such an example, the user may communicate a command from the wearable device to the mobile device via the first communication interface or the second communication interface 193, 194 described with respect to FIG. 1. Once the mobile device receives the command at block 530, the method proceeds to block 538. If the mobile device does not receive a command at block 530, the method proceeds to block 535 where the method further comprises retaining the activation of the call diversion feature for the mobile device. This means there may be no communication from the mobile device to the server regarding deactivation of the call diversion feature for the mobile device.

In some embodiments, at block 536, the method further comprises determining whether the wearable device is in contact with a user's body. The mobile device may make the determination of whether the wearable device is in contact with the user's body by receiving information from the wearable device as described with respect to FIG. 3. If the mobile device determines that the wearable device is in contact with the user's body, the method proceeds to block 535. If the mobile device determines that the wearable device is not in contact with the user's body, the method proceeds to block 538.

In some embodiments, at block 537, the method further comprises determining whether the mobile device is moving and/or whether the wearable device is stationary. The determination of whether the mobile device is moving may be made using information sensed by one or more sensors located in the mobile device, as described with respect to FIG. 3. The mobile device may determine that it is moving if the sensed movement of the mobile device, based on the information sensed by the one or more sensors, is equal to or greater than a threshold movement level. The determination of whether the wearable device is stationary may be made using information sensed by one or more sensors located in the wearable device, as described with respect to FIG. 3. The wearable device may determine that it is stationary if the sensed movement of the wearable device, based on the information sensed by the one or more sensors, is less than a threshold movement level. This determination may be communicated to the mobile device. In other embodiments, the wearable device may transmit the information sensed by the one or more sensors to the mobile device, and the mobile device may determine, using the received information, whether the wearable device is stationary. If the mobile device determines that the mobile device is moving and/or the wearable device is stationary, the method proceeds to block 538. If the mobile device determines that the mobile device is not moving and/or the wearable device is not stationary, the method proceeds to block 535 where the method further comprises retaining the activation of the call diversion feature for the mobile device.

In some embodiments, at block 538, the method further comprises determining whether a timer (e.g., the timer 117) associated with a previous activation of the call diversion feature has expired. For example, assume that the timer is deactivated, that the call diversion feature for the mobile device (e.g., the mobile device 110) is activated, and that the wearable device (e.g., the wearable device 120) subsequently moves from a location inside the threshold range of the mobile device as described with respect to FIG. 1 to a location outside the threshold range of the mobile device. This movement may cause the mobile device to communicate with the server (e.g., the server 130) to activate the call diversion feature for the mobile device. This communication may also cause activation of the timer. During the period when the timer is activated, the wearable device may move back to a location inside the threshold range of the mobile device such that the mobile device can establish a connection to the wearable device via the first communication interface (e.g., the first communication interface 192). This movement may not cause the mobile device to communicate with the server to deactivate the call diversion feature for the mobile device because the timer has not expired and is still activated. If this movement occurs after the expiration of the timer, the mobile device may communicate with the server to deactivate the call diversion feature for the mobile device. Therefore, if the timer in block 538 has expired, the method proceeds to block 540, and if the timer in block 538 has not expired, the method proceeds to block 535.

Blocks 510, 520, 530, 536, 537, and 538 may represent conditions that cause a call diversion feature to be deactivated at the mobile device. In some embodiments, another condition that causes a call diversion feature to be deactivated at the mobile device may be when the mobile device determines that the mobile device is moving and/or that the wearable device is stationary. In still other embodiments, another condition that causes a call diversion feature to be deactivated at the mobile device may be when the mobile device determines that the wearable device is not in contact with a user's body. Each of the various conditions may be considered singly or in combination for causing a call diversion feature to be deactivated at the mobile device. The deactivation of the call diversion feature at the mobile device may be initiated based on a communication, at block 540, from the mobile device to the server. At block 550, the method further comprises receiving (e.g., by the server) the communication from the mobile device. The communication may comprise a request to deactivate the call diversion feature for the mobile device. The communication may also comprise information (e.g., phone number, network address, device identification information, etc.) for the mobile device. The server may receive the information in the received communication, and may search for and determine an entry for the mobile device in the call diversion table (e.g., the call diversion table 136) based on the information. At block 560, the method further comprises deactivating the call diversion feature for the mobile device (e.g., selecting a 'no' for the mobile device as indicated in FIG. 2). Once the call diversion feature for the mobile device is deactivated, any calls received at the server and intended for the mobile device may be transmitted to the mobile device, and not to any wearable devices associated with the mobile device as indicated in the call diversion table.

The various blocks of FIG. 5 may be executed in any order, and the order is not limited to the order described herein. For example, block 510 may be executed substantially simultaneously as block 520, and alternatively, block 520 may be executed before or after block 510. Additionally, in some embodiments, some blocks may be optional. For example, block 520 may be optional. Prior to the execution of block 510, 520, 530, 536, 537, or 538, a call diversion feature may be activated for the mobile device. Blocks 510, 520, 530, 535, 536, 537, 538 and 540 may be performed by the mobile device 110. Therefore, these blocks may be stored as instructions in the memory 112, and may be executed by the processor 111 of the mobile device 110. Blocks 550 and 560 may be performed by the server 130. Therefore, these blocks may be stored as instructions in the memory 132, and may be executed by the processor 131 of the server 130.

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicatively coupled to," or other similar terms should generally be construed broadly to include situations both where communications and connections are direct between referenced elements or through one or more intermediaries between the referenced elements, including through the internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "greater than," "equal to," "less than," "during," and the like should be understood to mean "substantially greater than," "substantially equal to," "substantially less than," "substantially during," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

What is claimed is:

1. A method for diverting a call intended for a mobile device to a wearable device, the method comprising:
   activating a call diversion feature for the mobile device in response to receiving a communication from the mobile device, wherein the communication is received when a condition is met at the mobile device and the condition is met after a timer associated with a previous deactivation of the call diversion feature for the mobile device has expired;
   receiving the call intended for the mobile device;
   determining whether a call diversion feature is activated for the mobile device; and
   diverting the call to the wearable device in response to determining the call diversion feature is activated for the mobile device.

2. The method of claim 1, wherein the condition is met when the mobile device is unable to establish a connection to the wearable device via a first communication interface.

3. The method of claim 2, wherein the first communication interface comprises at least one member selected from the group consisting of a near field communication (NFC) interface, a Bluetooth interface, a Wi-Fi interface, a Wi-Fi peer-to-peer (P2P) interface, and a worldwide interoperability for microwave access (WiMAX) interface.

4. The method of claim 1, wherein the condition is met based at least partly on a schedule.

5. The method of claim 4, wherein the schedule comprises a one-time or recurring schedule.

6. The method of claim 4, wherein the schedule is configured by a user of the mobile device, or by a schedule-generating application in the mobile device that monitors a behavior pattern of the user of the mobile device.

7. A method for diverting a call intended for a mobile device to a wearable device, the method comprising:
   determining whether a condition to activate a call diversion feature for the mobile device is met;
   determining whether a timer associated with a previous deactivation of the call diversion feature has expired; and
   communicating with a server to activate the call diversion feature for the mobile device in response to determining that the condition is met and determining that the timer associated with the previous deactivation of the call diversion feature has expired, wherein the call intended for the mobile device and received at the server is diverted from the server to the wearable device, wherein the server is associated with a cellular network.

8. The method of claim 7, wherein the call comprises a voice call or a video call.

9. The method of claim 7, wherein the condition is met when the mobile device is unable to establish, via a first communication interface, a connection to the wearable device.

10. The method of claim 9, wherein the first communication interface comprises at least one member selected from the group consisting of a NFC interface, a Bluetooth interface, a Wi-Fi interface, a Wi-Fi P2P interface, and a WiMAX interface.

11. The method of claim 9, further comprising determining the mobile device is stationary based at least partly on information sensed by one or more sensors in the mobile device, and wherein the condition is further met when the mobile device determines that the mobile device is stationary.

12. The method of claim 9, further comprising determining, based at least partly on information sensed by one or more sensors in the wearable device and received from the wearable device, the wearable device is moving, and wherein the condition is further met when the mobile device determines that the wearable device is moving.

13. The method of claim 7, wherein the condition is met based at least partly on a one-time or recurring schedule configured by a user of the mobile device.

14. The method of claim 7, wherein the condition is met based at least partly on a one-time or recurring schedule configured by a schedule-generating application in the mobile device that monitors a behavior pattern of a user of the mobile device.

15. The method of claim 7, wherein the condition is met when a command is received at the mobile device from the wearable device to activate the call diversion feature.

16. A mobile device comprising:
a memory; and
a processor, coupled to the memory and configured to:
   determine whether a condition to activate a call diversion feature for the mobile device is met;
   determine whether a timer associated with a previous deactivation of the call diversion feature has expired; and
   communicate with a server to activate the call diversion feature for the mobile device in response to determining that the condition is met and determining that the timer associated with the previous deactivation of the call diversion feature has expired, wherein a call intended for the mobile device and received at the server is diverted from the server to a wearable device, wherein the server is associated with a cellular network.

17. The mobile device of claim 16, wherein the condition is met when the mobile device is communicatively decoupled from the wearable device.

18. The mobile device of claim 16, further comprising one or more sensors, and wherein the processor is further configured to determine the mobile device is stationary based at least partly on information sensed by the one or more sensors, and determine the condition is met when the mobile device determines that the mobile device is stationary.

19. The mobile device of claim 16, wherein the condition is met based at least partly on a first one-time or recurring schedule configured by a user of the mobile device, or on a second one-time or recurring schedule configured by a schedule-generating application in the mobile device that monitors a behavior pattern of the user of the mobile device.

20. The mobile device of claim 16, wherein the condition is met when a command is received at the mobile device from the wearable device to activate the call diversion feature.

21. A non-transitory computer readable medium comprising code, the code, when executed by one or more processors of a mobile device, causes the mobile device to:
   determine whether a condition to activate a call diversion feature for the mobile device is met;
   determine whether a timer associated with a previous deactivation of the call diversion feature has expired; and
   communicate with a server to activate the call diversion feature for the mobile device in response to determining that the condition is met and determining that the timer associated with the previous deactivation of the call diversion feature has expired, wherein a call intended for the mobile device and received at the server is diverted from the server to a wearable device, wherein the server is associated with a cellular network.

22. The non-transitory computer readable medium of claim 21, wherein the code, when executed by the one or more processors of the mobile device, further causes the mobile device to determine the condition is met when the mobile device is communicatively decoupled from the wearable device.

23. The non-transitory computer readable medium of claim 21, wherein the code, when executed by the one or more processors of the mobile device, further causes the mobile device to determine the condition is met based at least partly on a first one-time or recurring schedule configured by a user of the mobile device, or on a second one-time or recurring schedule configured by a schedule-generating application in the mobile device that monitors a behavior pattern of the user of the mobile device.

24. The non-transitory computer readable medium of claim 21, wherein the code, when executed by the one or more processors of the mobile device, further causes the mobile device to determine the mobile device is stationary based at least partly on information sensed by one or more sensors in the mobile device, and determine the condition is met when the mobile device determines that the mobile device is stationary.

25. The non-transitory computer readable medium of claim 21, wherein the code, when executed by the one or more processors of the mobile device, further causes the mobile device to determine the condition is met when a command is received at the mobile device from the wearable device to activate the call diversion feature.

* * * * *